United States Patent
Yücel et al.

(10) Patent No.: US 8,479,089 B2
(45) Date of Patent: Jul. 2, 2013

(54) CONSTRUCTING AND APPLYING A CONSTRAINT-CHOICE-ACTION MATRIX FOR DECISION MAKING

(75) Inventors: Sermet Yücel, Edina, MN (US); William D. Headrick, Maplewood, MN (US); Samuel E. Martin, St. Paul, MN (US); M. Germana Paterlini, Edina, MN (US)

(73) Assignee: Certusoft, Inc., Minneapolis, MN (US)

( * ) Notice: Subject to any disclaimer, the term of this patent is extended or adjusted under 35 U.S.C. 154(b) by 82 days.

(21) Appl. No.: 13/042,591

(22) Filed: Mar. 8, 2011

(65) Prior Publication Data

US 2012/0233533 A1 Sep. 13, 2012

(51) Int. Cl.
*G06F 17/00* (2006.01)
*G06F 17/30* (2006.01)

(52) U.S. Cl.
USPC ........... 715/212; 715/267; 715/273; 715/762; 707/E17.076; 707/805

(58) Field of Classification Search
USPC ............. 715/200, 201, 202, 204, 213, 267, 715/700, 205, 212, 226, 227, 256, 273, 762; 707/609, 805, 810, 912, E17.014, E17.016, 707/E17.076
See application file for complete search history.

(56) References Cited

U.S. PATENT DOCUMENTS

| | | | |
|---|---|---|---|
| 6,439,783 B1 * | 8/2002 | Antoshenkov | 1/1 |
| 6,721,729 B2 * | 4/2004 | Nguyen et al. | 1/1 |
| 8,122,366 B2 * | 2/2012 | Harrold et al. | 715/762 |
| 2002/0023077 A1 * | 2/2002 | Nguyen et al. | 707/1 |
| 2003/0115170 A1 * | 6/2003 | Turner et al. | 707/1 |
| 2008/0022216 A1 * | 1/2008 | Duval | 715/762 |
| 2011/0066959 A1 * | 3/2011 | Harrold et al. | 715/762 |

* cited by examiner

*Primary Examiner* — Maikhanh Nguyen
(74) *Attorney, Agent, or Firm* — Beck & Tysver, PLLC

(57) ABSTRACT

The present invention is an apparatus and method for constructing a Constraint-Choice-Action Matrix for making decisions based on constraints. Columns (in one matrix orientation) state conditions. The column header presents a partial boolean expression. Such variable expression may be any object or type, e.g., a number, string, or list. An entry in a cell, selected using a GUI pick-list, combines with the column header, to complete the boolean expression. The set of boolean expressions in a row may be combined into an action boolean statement. If that statement evaluates to true, some action, represented as a row header, is recommended or executed. The matrix is applied to an instance of a context domain, for decision-making. The context domain may be represented in a model representing an instance of that domain (e.g., a product specification for configuration of a machine) in data and rules.

9 Claims, 16 Drawing Sheets

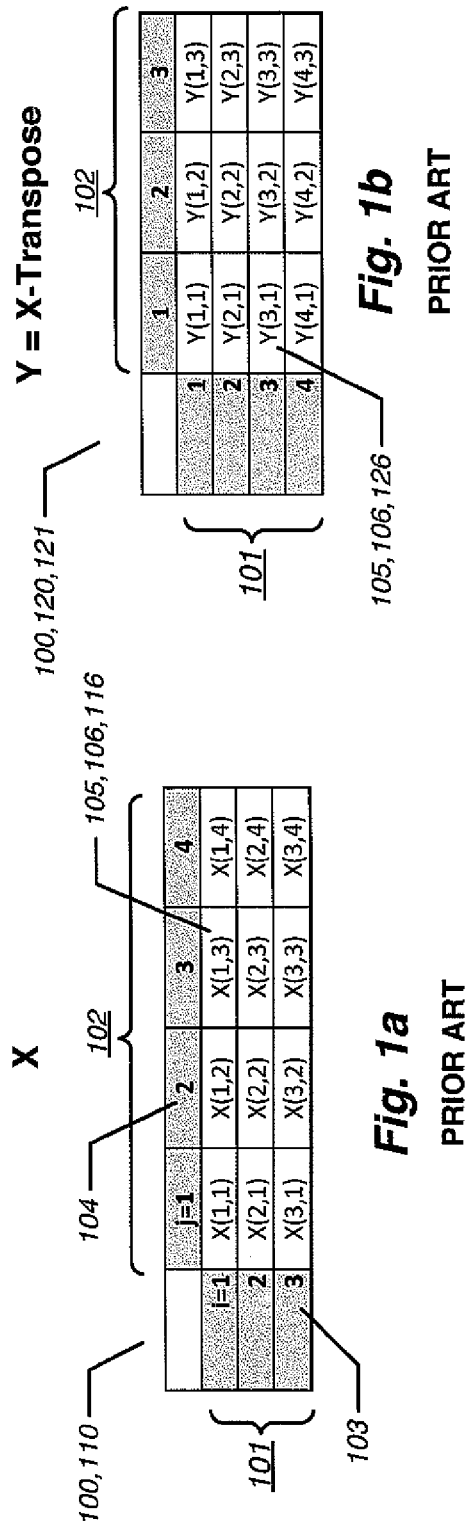
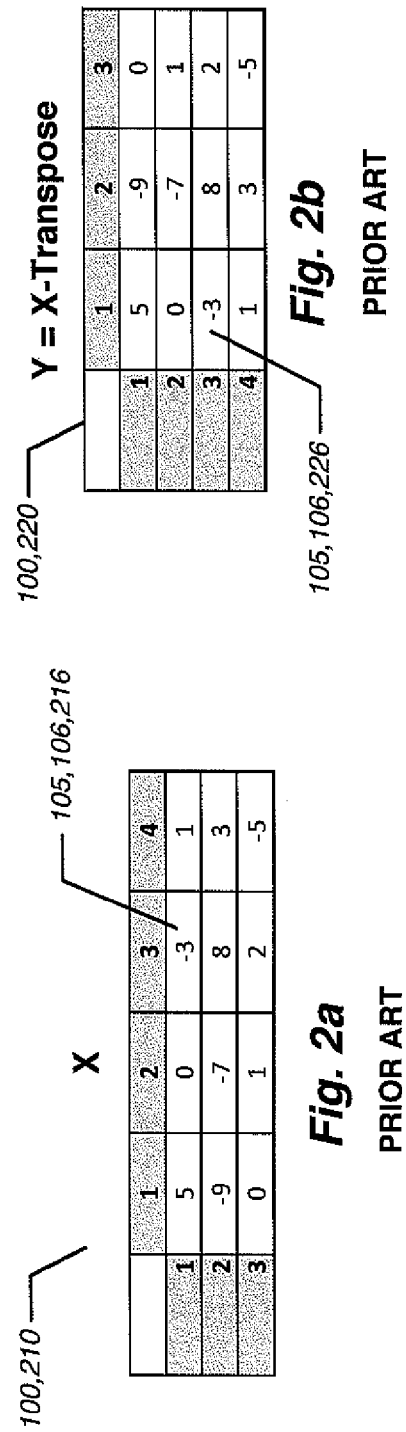

CONSTRUCTING AND APPLYING A CONSTRAINT-CHOICE-ACTION MATRIX FOR DECISION MAKING

CROSS-REFERENCES TO RELATED APPLICATIONS

This application is related to U.S. application Ser. No. 12/589,447, filed Oct. 23, 2009, entitled "Automated Hierarchical Configuration of Custom Products with Complex Geometries: Method and Apparatus", and hereby incorporated by reference. This application is also related to U.S. application Ser. No. 12/589,492, filed Oct. 23, 2009, entitled "A Parametric Configurator for Product Design: System and Method", and hereby incorporated by reference.

FIELD OF THE INVENTION

The present invention relates to decision making by computer systems. More specifically, the present invention relates to a matrix displayed by a computer system graphical user interface, through which a user can specify a set of conditions under which specific actions should occur.

SUMMARY OF THE INVENTION

We focus throughout this document on a particular subject matter domain, namely, the configuration and manufacture of commercial vehicles such as trucks and buses. The topic illustrates principles of much broader applicability to other contexts, and aspects peculiar to the commercial vehicle domain should not be regarded as limiting the inventive concept.

When engineering a seating subsystem for a new school bus, factors (or "variables" or "features") that dictate specifications for a particular seat part may include, for example, seat depth, seat width, seat covering, and covering color, in addition to variables involving arm rests, structural support, and means for attaching the seats to the floor. The complete engineering of the bus will include systems for engine, drivetrain, transmission, chassis, lavatory, and so forth. For each system, each of these variables will take on two or more values. For example, the bus may or may not require a lavatory. This is a boolean—yes/no, true/false, or one/zero—variable. Other variables may take on a relatively small, easily enumerated, number of values, such as choices available for chassis exterior color.

Some variables will take on values that constitute a set or list. For example, all vendors that are acceptable for supplying some subsystem might be listed.

Some variables, such as length of a drive shaft, may take on a continuous range of values, if a shaft can be cut to any length. However, providing an enumerated set of relatively closely-spaced choices for such a variable will satisfy the needs of many engineering designs. Generally, we will focus on making choices from a finite, albeit potentially quite large, discrete set.

In a configuration, design, manufacturing, or engineering environment, a team must deal with certain combinations of choices, one or more choices for each factor. That a given combination is of interest will have some consequence, such as an action to be taken. For example, each such combination may represent a part number that might be used in bills of materials (BOMs) for assembling vehicles. Tangible physical parts for the system represented by the part number might need to be manufactured or purchased, and added to inventory.

We define a "constraint", or equivalently, a "condition", to be a binary statement relating a variable or factor to a particular one of the possible choices for values of that variable or factor. In the school bus example, lavatory might be a factor, and "included" and "not included" might be possible choices that factor. Thus, "lavatory is included" would be a constraint, as "lavatory is not included" might also be. For a given context domain instance of a school bus, either of these constraints is a binary statement, or binary expression—a statement or expression that will evaluate to TRUE or FALSE when the statement is applied to some situation or object in the context domain. Note that in some contexts, it is customary to express a constraint in a grammatical shorthand, such as "lavatory included" or "hp EQ 500" (HP is horsepower), where the verb is omitted or truncated. Shorthand expression of a constraint does not remove the constraint from scope of the inventive concept.

There may be many variable/choice combinations that can express the same constraint. Consider, for example, the constraint upon an engine system for a truck, "horsepower>500". The "variable" in this case might be "horsepower>" and a choice for that variable might be "500". In an alternative way for expressing the same constraint, the variable is "horsepower>500" and the choice is "TRUE". Or the variable might be "horsepower" and the choice is ">500". Or the variable might be "horsepower ? 500" and the choice is ">". In each case, a concrete constraint is formed from a variable constraint and a choice or value of the variable.

We will refer to the variable portion of a constraint (or condition) as itself a constraint (or condition), in the same way that one might say "let x be an integer between 1 and 10". In fact, x is a variable that represents an integer that is unknown. Similarly, one might say let "horsepower>?" be a constraint; in fact, the expression "horsepower>?" is a variable constraint that will become a complete, concrete constraint if the '?' is replaced by one of several enumerated operand values. In contexts where the ambiguity might be important, we will qualify a constraint as either variable or as "concrete", "complete", or "fully qualified".

Determination of whether to take a particular action usually involves a plurality of concrete constraints. These constraints can be combined to form an "action boolean expression", such that if the expression evaluates to TRUE for an instance of the context domain, then the associated action should be taken. The action boolean expression may involve AND, OR, and NOT operators; grouping of combinations of constraints (e.g., customarily using parentheses); and default grouping priority rules (e.g., absent explicit grouping, NOT groups more tightly than AND, which in turn groups more tightly than OR), as are customary in mathematics and logic. For example, if a, b, and c are constraints, then "(a OR b) AND c" is TRUE if and only c is TRUE and either a or b is TRUE. In the simplest case, which may be the default, the constraints are simply AND-ed together to form the boolean statement for the action.

For everyone concerned with design, manufacturing, supply chain, logistics, and inventory management, because visual display of this information is simple and intuitive, constraints and actions might be expressed in a matrix in a spreadsheet. The spreadsheet might be rendered by a spreadsheet program such as Microsoft EXCEL® or OpenOffice.org CALC, or, alternatively, in a software environment specific to the practical contextual application of the information, such as in product configuration (i.e., engineering design) or manufacturing of commercial vehicles.

For our purposes, we define a "matrix" as a two-dimensional construct for representing data, having a finite number of rows and a finite number of columns. A "row" is a horizontal sequence of "cells", and a "column" is a vertical sequence of cells. A cell "value" or "entry" may be a data item, which could be, for example, a number, a boolean (TRUE/FALSE) value, a set, a list, a text string, an image, or any other type of data "object" or entity, or it may be empty or blank.

Consider the matrix $X(i,j)$, where $i=1, 2, \ldots, M$, and $j=1, 2, \ldots, N$. X has M rows and N columns. $X(i,j)$ is the value of matrix X for the cell at the intersection of the i-th row and j-th column. The "transpose" of X is the matrix Y such that $Y(j, i)=X(i,j)$; Y has N rows and M columns. For the sake of convenience, the following discussion will assume a matrix orientation where rows and columns have respective particular significance and meaning. Clearly, the transposed orientation is equivalent in terms of information content, and the particular configurations described should not be taken as limiting the scope of the invention.

We want to express the relationships among variable constraints, values, and actions in matrix/spreadsheet form. One alternative is make rows correspond to actions, and columns correspond to constraints. The constraint columns pertaining to a given factor/variable can be grouped, typically with a higher level column header spanning all the columns for that factor. A group of columns for a variable may be filled with a different color from the adjacent groups to improve visibility. For example, groups of columns may alternate in background color from yellow to green, when proceeding form left to right. Entries in cells may be, for example, an 'x' to indicate selection of a particular choice, or blank for those choices that are not selected.

The above-described approach at first appears to satisfy the requirements of being both simple and intuitive. Applicant has recognized, however, that it does not scale well. A company that designs or manufactures vehicles may need to consider many different combinations of choices corresponding to the factors or features describing a particular system. For example, a given combination of choices for the factors may correspond to a particular part number to be added to a BOM for construction of the vehicle.

If defining an action (e.g., selecting a seating system) involves NV factors or variables, and the j-th variable/factor $F(j)$ corresponds to $NC(j)$ choices, then the total number of choices is $NC(1)+NC(2)+ \ldots +NC(NV)$. As a concrete example, suppose that there are 10 factors in a given system, each corresponding to 6 choices. (The number of choices for different variables may in general be different.) Then the total number of choices TC is 6*10=60. Obviously, many situations might involve much larger values of TC.

A matrix can have any row and column dimensions, so hundreds or thousands of columns present no theoretical problem. In practice, however, such a large matrix may be nearly useless for expressing the desired information to engineers, customers, and other stakeholders. The matrix may not fit on a single computer display screen, or even on two or more screens with a matrix depiction that extends across them. At some point, the software or the hardware will bound the number of rows, columns, and/or cells. Using the transpose of the matrix might help in some cases because spreadsheet tables scroll vertically more conveniently than horizontally, but not always, since the number of actions might also be large.

In addition to these limitations on display of the information, there is a more fundamental issue with this approach. Consider, for example, a matrix in which there are on average 10 choices per variable. In many practical contexts, for each action, typically only 1 of the 10 is selected, so 90% of the matrix is empty space. The consequent sparsity of the matrix, combined with its sheer size, detracts from its intuitiveness. It is possible that a given factor may have several choices checked, which would make the matrix less sparse, but in many applications that is the exception rather than the rule.

In manufacturing and design environments, permissible actions, such as parts that may be selected for a BOM, change routinely. That fact implies that a matrix of choices and actions will require frequent modifications. Adding a new choice for a single variable will introduce cells for each existing action, cells that may need to be considered and filled appropriately by an engineer. Adding a new action will also require consideration and appropriate entries for each variable/choice pair. Sustainability can become an intractable problem.

Suppose that each possible combination of choices, one per variable per combination, were to have a corresponding action. For example, suppose that there are 6 variables and 10 choices for each. Then the total number of actions would be 10 raised to the 6th power, or one million. In practice, however, the number of interesting combinations, NA, for which action is required will necessarily be much less than this maximum value. Someone—possibly an engineer or technician—must choose which choice combinations are interesting, commercially or otherwise, and assign actions just to those choice combinations. The vastness of a matrix of choice columns and action rows can make this task truly daunting.

Applicant's approach is to reduce the column dimension of the matrix to be equal to the number of variables, making it independent of the number of choices for each variable. This is achieved by making the choice of entries for cells of the matrix selectable from a list. We define a "pick-list" to be a GUI control from which one or more items can be selected by a user. If it is appropriate for a cell to have multiple entries, then the pick-list will allow a single item or, depending on the purpose of the pick-list, a set of items, to be selected.

We will refer to such an active matrix as a Constraint-Choice-Action (CCA) Matrix. A user may perform a mouse click, or equivalent action on the cell itself or on a control associated with the cell to make a selection. When logic, embodied in some combination of hardware and software, senses a request being input through an appropriate control, a list of the choices for that variable is presented to the user. The control might be, for example, a drop-down list, a choice box, or a table. Selection may cause the selected item to be highlighted, or there might be a box or circle adjacent to an item that indicates selection, by blackening, or by a check or 'X' character. When the logic senses a user selection from the list, it sets the value of the cell to the selected choice, and depicts the value in the matrix through the GUI on the display. If the choice is itself a list or a set, then the pick-list may allow multiple selections, or the set might be specified by a name (e.g., current players on the Texas Longhorns football team). A cell in which multiple choices have been selected may have a scroll-bar, and may be searchable using some kind of search control.

All the wasted empty space may be eliminated from the matrix in this way. The number of columns is reduced from the number of choices to the number of factors. The variables and choices for each may be stored in a repository on a computer-readable storage medium, and retrieved by query logic to populate the matrix and choice lists. The storage medium may be a hard disk, solid state memory, volatile memory, or any other medium that can store information digitally. The repository may be a relationship or object-oriented database, or it may be a table in memory, it may be hard-coded in software instructions, or represented in any other form. A repository may be in several parts, media, and/or formats. The repository may be queried to access any information stored therein for the CCA Matrix.

Modifying a CCA Matrix to reflect evolving conditions (e.g., in manufacturing, supply chain management, inventory management, logistics, and regulation) is greatly simplified. A new choice for a variable can be added, with little effort, by adding a table entry to the repository. When the repository is next queried, the new choice will become available in the matrix. Adding a new action row requires merely making selections from cell pick-lists, one per factor. (Note that an "action" may be generalized to a "conclusion" or "row conclusion" in some CCA Matrices. A "conclusion" may not expect execution.) Recall that row entries depict a boolean expression (an action boolean expression, or row boolean expression), formed by combining the constraints represented by the cells (the cell boolean expressions, which are concrete boolean expressions based on the variable boolean expression for the column, which might be called the column boolean expression), the action boolean expression corresponding to an action to be taken if the expression evaluates to TRUE when applied to an object or situation that is an instance of a context domain. Adding a new factor or variable only requires one selection per action.

The list of actions/row headers may be similarly stored and queried. In some cases, the actions may be automatically generated by logic, either when a new row of (column) constraints is created, or an existing row is modified. In this regard, consider a matrix that specifies an order to a supplier of transmission parts, to be used by an assembler to manufacture the transmission system of a truck. The "action" in this case might be the specification of a BOM part number. The new part number may be sent in an order to the supplier, along with the associated constraint specification. The supplier might use existing off-the-shelf product, or create a whole new product type. With modern precision robotic equipment and more intelligent software and hardware control, creating highly specific manufactured goods continues to become easier.

Once the matrix has been populated using the above approach, it can then be used by logic to make decisions. In particular, a CCA Matrix might be used in either product design/configuration or product manufacture. For example, U.S. patent application Ser. No. 12/589,492 describes a process for optimized configuration of a vehicle. Logic of such a process might generate constraints on a subsystem, such as a drivetrain. These generated constraints can then be compared with those of a CCA Matrix for that system. If a system qualification statement evaluates to TRUE, then the corresponding action is recommended, and possibly taken.

Conceivably, more than one system qualification may evaluate to TRUE. This might trigger an alert, or there might be criteria for choosing one from among them, such as by comparing costs of taking each of the actions. Or all system qualifying statements evaluating to TRUE might be returned to the design optimization tool, allowing it to make its own assessment of preferability.

It is also possible that no system qualification statement is true for the target system. Again, this might trigger an alert, or it might cause a new matrix row to be automatically generated, possibly along with an automatically generated action, such as a BOM part number.

BRIEF DESCRIPTION OF THE DRAWINGS

FIG. 1a is a chart illustrating conventions of matrix notation using a variable matrix X.

FIG. 1b is a chart illustrating conventions of matrix notation using a variable matrix Y, which is the transpose of X from FIG. 1a.

FIG. 2a is a chart illustrating conventions of matrix notation using a particular instance of a matrix X.

FIG. 2b is a chart illustrating conventions of matrix notation using a particular instance of a matrix Y, which is the transpose of X from FIG. 2a.

FIG. 7 is a chart, illustrating a Constraint-Choice-Action Matrix for a drivetrain, where the constraints include inequalities and unary boolean expressions.

FIG. 8 is a chart, illustrating a Constraint-Choice-Action Matrix for a drivetrain, using the transpose of the CCA matrix of FIG. 7.

DETAILED DESCRIPTION OF EXEMPLARY EMBODIMENTS

Figure 3:
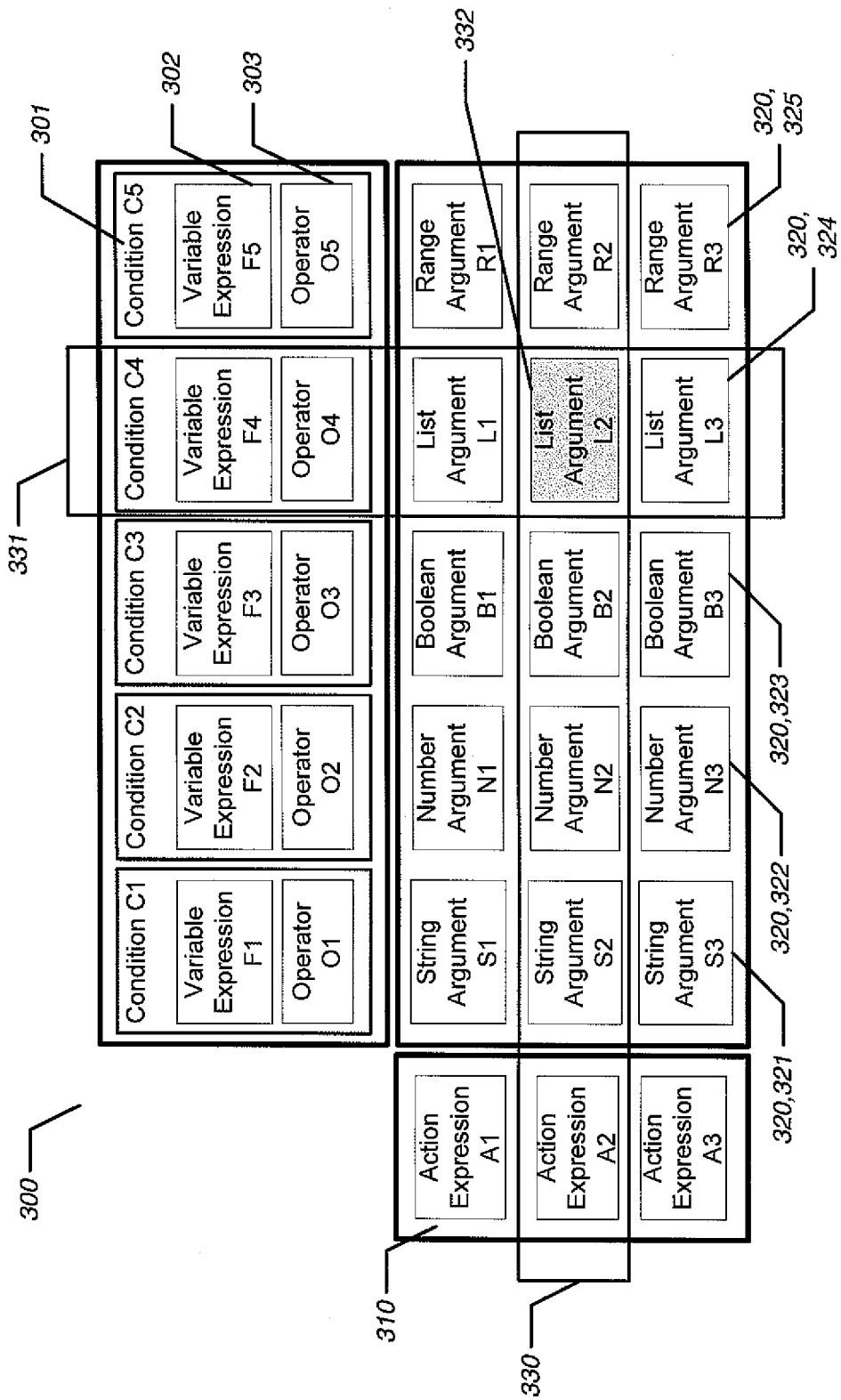
FIG. 3 is a chart illustrating contents of a Constraint-Choice-Action Matrix.

This description provides embodiments of the invention intended as exemplary implementations. The reader of ordinary skill in the art will realize that the invention has broader scope than the particular examples described here.

FIG. 1a-2b are a basic introduction to matrix 100 notation. These figures present concepts, such as rows, columns, column and row headers, and matrix transpose, that are fundamental to subsequent discussion.

FIG. 1a is a chart illustrating conventions of matrix notation using a variable matrix X 110, in which the entries are all variables. This matrix 100 has three rows 101 and four columns 102. The row index 103, i, and the column index 104, j, are typified by the respective values as labeled in the figure, namely, i=3 and j=2. Every pair of (i,j) locations in the matrix 100 defines a cell 105. Each cell 105 contains an entry 106 or value 106 of the cell 105. This matrix 100 has variable entries 106, such as X(1,3) for the entry 106 at row 1 and column 3.

FIG. 1b depicts variable matrix Y 120, which is the transpose 121 of matrix X 110 from FIG. 1a. The transpose 121 swaps the rows 101 and columns 102 of a matrix 100, so matrix Y 120 has four rows 101 and three columns 102. By definition of transpose 121, Y(j,i)=X(i,j), so, for example, that the entry 126 in cell 105 (3,1) of Y is equal to the entry 116 in cell 105 (1,3) of X.

FIGS. 2a and 2b show particular examples of a matrix X 210 and its transpose 121, matrix Y 220. In this case, the entries 216 of matrix X 210, and corresponding entries 226 of matrix Y 220 are all numeric. For example, X(1,3)=Y(3,1)=−3. The concept of matrices, however, is far more general than matrices having numeric entries 106, with entries 106 being almost anything—vectors, lists, other matrices, text strings, operators, and so forth. An entry 106 can be empty or null. Essentially, a matrix 100 might contain anything that might be contained in a two-dimensional table, including one depicted on a display (e.g., a monitor on a computer, touchscreen system, or handheld electronic device) by spreadsheet software, through a graphical user interface (GUI).

FIG. 3 is a chart characterizing contents of a Constraint-Choice-Action (CCA) matrix 300 in an embodiment of the invention. The columns 102 of the CCA matrix 300 represent variable conditions 301 or variable constraints 301, which are variable boolean expressions. The cells 105 are concrete boolean expressions, concrete constraints 301. The rows 101 represent action boolean expressions, that correspond to actions 310. Of course, the transpose 121 of a CCA matrix 300 is also a CCA matrix 300, because it conveys the same information in a different but equivalent format; this is illustrated by comparison of FIGS. 7 and 8. Unless otherwise specified in context, we will henceforth use the orientation of FIG. 3 for clarity, without further comment and without loss of generality.

The columns 102 of a CCA matrix 300 represent variable constraints 301 or variable conditions 301, that may be expressed in column headers of a spreadsheet, or other software presentation, depicting the CCA matrix 300. Within a CCA matrix 300, a condition 301 is always a boolean statement, an expression that can be evaluated as being TRUE or FALSE in some "context domain". For example, a given CCA matrix 300 may pertain to a context domain for example, system of a commercial vehicle, such as transmission, chassis, or drivetrain.

As applicable to all entries 106 in a column 102, the condition 301 will be always lacking something. In that sense, it is a variable. The entry 106 of each particular cell 105 in the column 102 completes the variable boolean expression for the column, in a respective way.

For example, for an engine system, a column 102 may represent the variable boolean expression, "horsepower>?".

The question mark '?' may be replaced in different ways by entries 106 in the cells 105 of the column 102, for example, by values of 300, 400, and 500.

The particular constraint 301 just described expects a number argument 322 in each cell 105 of the column 102. The embodiment depicted by FIG. 3 also includes columns 102 that respectively require, for each cell 105, a value 106 that is a string argument 321, a boolean argument 323 a list argument 324 or a range argument 325.

Figure 14C:
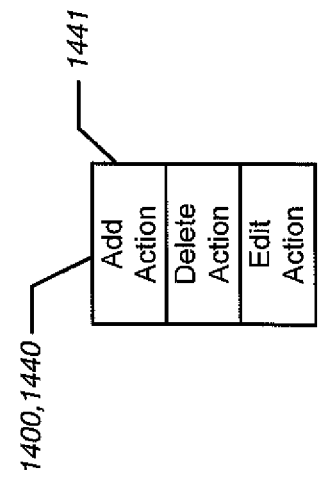
FIG. 14c is a drop-down list illustrating choices for modifying the set of actions (typically row heads) in a Constraint-Choice-Action Matrix.
Figure 14B:
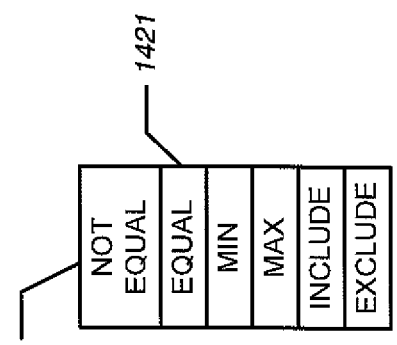
FIG. 14b is a drop-down list illustrating choices for operators in forming a condition/constraint in a Constraint-Choice-Action Matrix.

The conditions 301, as embodied by the column headers in the embodiment of FIG. 3, each have two parts: a variable expression 302 or factor 302, and an operator 303. In the engine system example above, the factor 302 is "horsepower" and the operator 303 is ">" (greater than, or "GT"). More examples of operators 303 are shown in FIG. 14b.

Separation between a factor 302 and an operator 303 in a variable expression 302 is not necessary to the invention. However, this arrangement makes it convenient to assemble a constraint 301 using pick-lists 1400, as will be discussed in connection with FIG. 4, or a Context Domain Model 924, as will be discussed in connection with FIG. 10-12b.

Particularizing the condition 301 expression that is applicable to the whole column 102 with the entry 106 of a particular cell 105 forms a boolean statement that takes can take on a binary value, yes/no, TRUE/FALSE, or 1/0 when applied to an instance of the context domain of the matrix, such as a vehicle or an engine. A CCA matrix 300 is applies to decision-making to some context or subject matter domain—e.g., to an object or a situation. For example, in the engineering or manufacture of industrial vehicles, the domain might be a system, such as drivetrain, engine, chassis, or seating. For a particular seat, for example, the boolean expression should be either true or false.

A row 101 of the CCA matrix 300, therefore, represents a sequence of boolean condition statements against which a target object or situation can be tested. The individual constraints represented by the cells 105 within a row 101 can be combined together to form a row boolean expression, or action boolean expression. For example, in FIG. 3, the selected value 332 combined with Condition C4 in the selected condition column 331 is one individual boolean condition statements being combined within the selected action row 330. In the simplest case, the individual constraints might be combined with AND, implying that to satisfy the row boolean statement, all the individual constraints would have to be true. In many cases, AND will be the default method of combining entries 106, cell boolean expressions, of a row 101 into an action boolean expression.

Alternatively, an action boolean expression might be formed by combining the individual entries 106 by OR. More generally, the action boolean expression might be formed using combinations of boolean operators AND, OR, and NOT, along with precedence rules for grouping by priority and by use of parentheses. For example, if a-d are cell boolean expressions, then a and (b or c) might be a corresponding action boolean expression. How cell boolean expressions combine to form an action boolean expression is usually the same for all rows 101 in a CCA matrix 300, and is specified before cells 105 are populated. In the CCA matrix 300 of FIG. 3, AND is implicitly understood. In other cases, the operations for combining individual cell boolean statements into a row boolean statement might be expressed, for example, above the column headers, or in some separate documentation such as a repository of a Context Domain Model 924.

Rows 101 of a CCA matrix 300 have a respective action 310. The idea is that if the action boolean expression is true for an object or situation that is an instance of the context domain, then the action 310 should be taken. The action 310 might be anything that can be executed—for example, to use a particular part number in a BOM; to execute a particular software module; or to order more material.

Two important applications for CCA matrix 300 are product configuration and product manufacturing. Within product configuration, exemplary actions include: (1) select a feature; e.g., set color to red; (2) make a feature unavailable; e.g., a highway truck may not have an automatic transmission; (3) update price when a vehicle has some combination of features; e.g., if a truck has both engine E and transmission T, then the driveline has price equal to $5,000; (4) update an attribute; e.g., if a truck has both engine E and transmission T, then the driveline has weight equal to 4,000 lb; and (5) check compliance; if a truck has both engine E and transmission T and wheelbase greater than W, then it violates a federal bridge law.

Within product manufacturing, exemplary actions include: (1) calculate delivery times; e.g., when truck has features A and B, manufacturing is delayed by 10 days; (2) update a BOM; e.g., when truck has features A and B, add part C to a BOM; (3) choose supplier; e.g., when a truck is built in plant P, part C is procured from supplier S; (4) choose a facility; e.g., when truck is built in plant P, then part C will be manufactured in plant Q; (5) accommodate part; e.g., when truck has features A and B, add frame piercing hole at location (x,y,z); (6) select locations; e.g., when truck has primary tank A and secondary tank B, mount primary tank outside right rail; and (7) improve functionality, performance, or safety; e.g., when the distance between two crossmembers exceeds 180 cm, add an intermediate crossmember.

Figure 4:
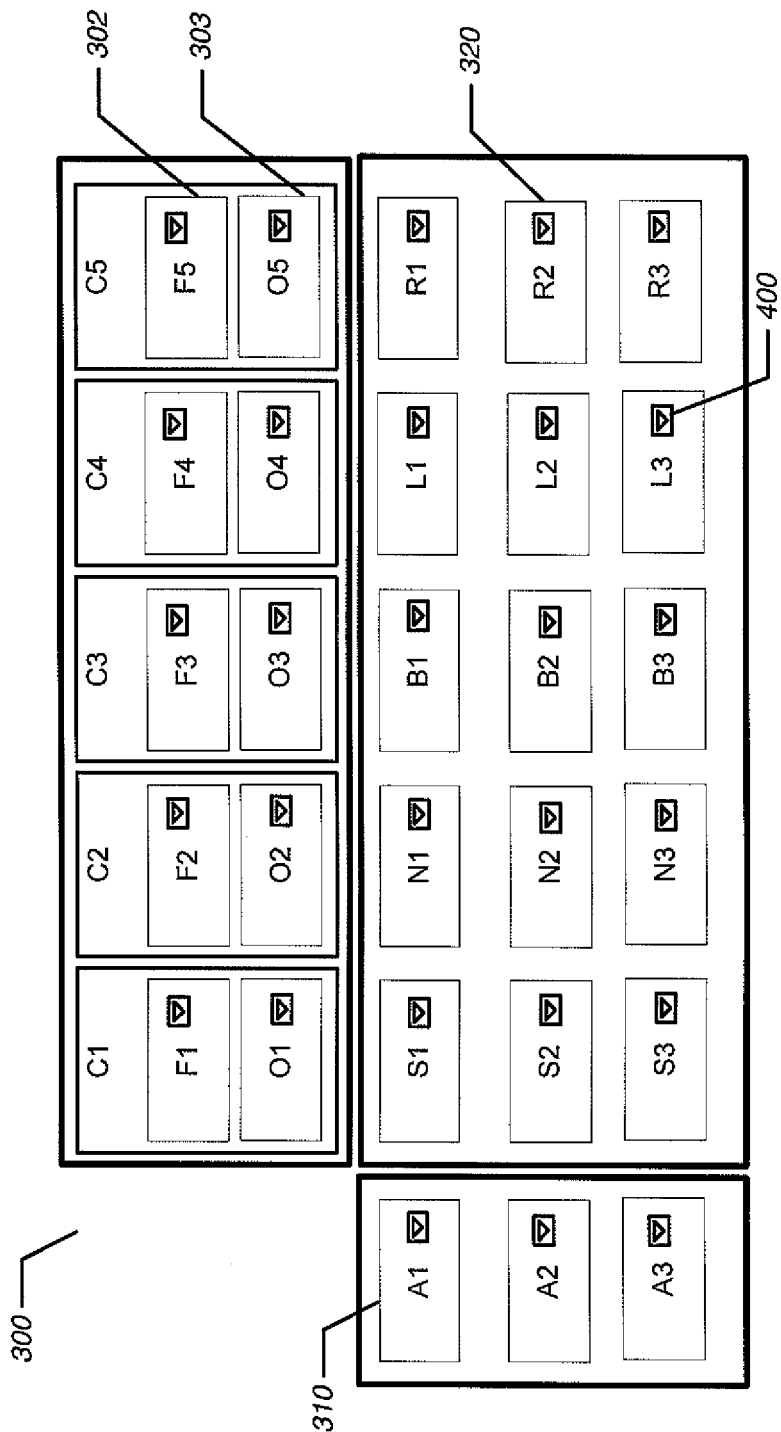
FIG. 4 is a chart, corresponding to FIG. 3, that illustrates the use of controls that trigger drop-down lists for populating a Constraint-Choice-Action Matrix

FIG. 4 is the CCA matrix 300 of FIG. 3, notationally condensed in an obvious manner. This figure shows where GUI controls 400, typified the one labeled in the figure with a reference number, might facilitate creation of a CCA matrix 300 using pick-lists 1400. By pick-list 1400 we mean any GUI control that presents a list and gives the user a means of selecting from the list. Selection may be accomplished, for example, by point-and-click with a device like a mouse, a touchpad, or the user's finger (in the case of a touchscreen), or using arrow and enter keys on a keyboard. The exact form in which the list drops down, or pops up, or whatever, is immaterial to the inventive scope. We use the term "pick-list" to encompass all these possibilities. Depending on the particular application, a pick-list might allow only one, or might allow multiple choices 510. If multiple choices 510 are allowed, then the resulting list in a header or cell entry 106 may be scrollable and/or searchable.

Values 106 in individual cells 105, regardless of type (e.g., number, string, list), will typically be selectable in this way. Constraints 301 specified in column headings, possibly by separate selection of factors 302 and operators 303, might also be selectable in this way. Similarly, actions 310 (row headings) might also allow such selection. Selection of column and row headings by pick-lists 1400 is convenient, but optional.

Figure 5:
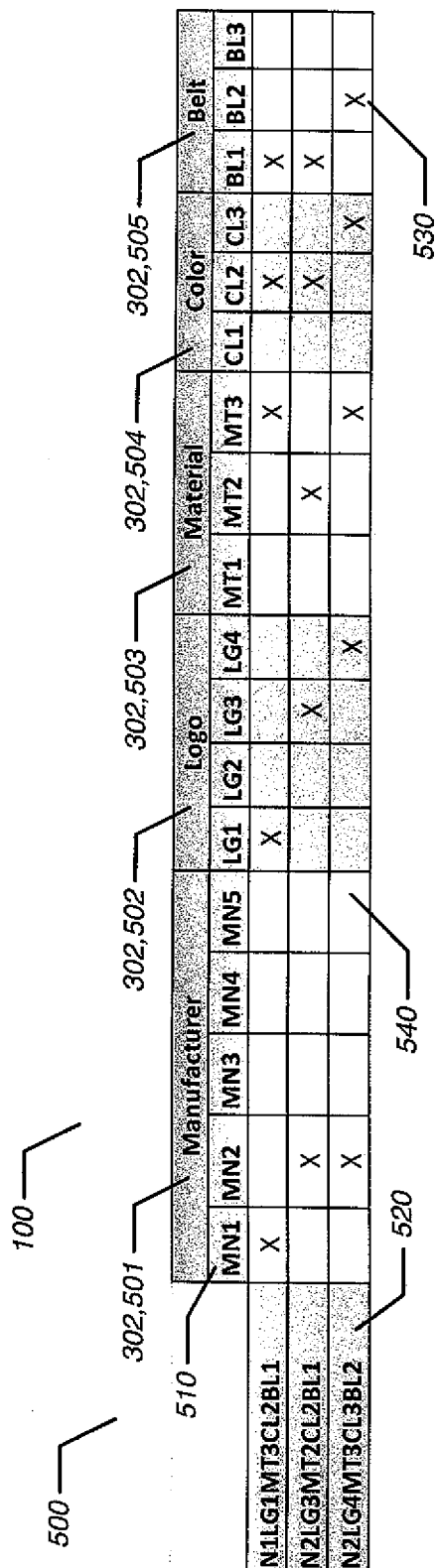
FIG. 5 is a chart illustrating a sparse matrix used to specify requirements for a parts for a seating system in a bill of materials.

FIG. 5 illustrates a Seat System BOM matrix 500 (that is not a CCA matrix 300), which might be used to associate seating system configurations with BOM parts 520. The top row of column headers include the factors Manufacturer 501, Logo 502, Material 503, Color 504, and Belt 505 type. The second row of column headers includes a cell for each choice 510 for each factor, with shading visually associating each choice with its corresponding factor. The information is graphical, simple, and expressive. But note that, in this case, because there is only one selection 530 for each factor, most of the matrix 100 is empty cells 540. This matrix is intended to be interactive and easy to modify and update. When the number of factors and/or the number of choices per factor becomes large, then the matrix 100 will quickly become too large to conveniently fit on most displays 910. At this point, intuitiveness evaporates.

Figure 6:
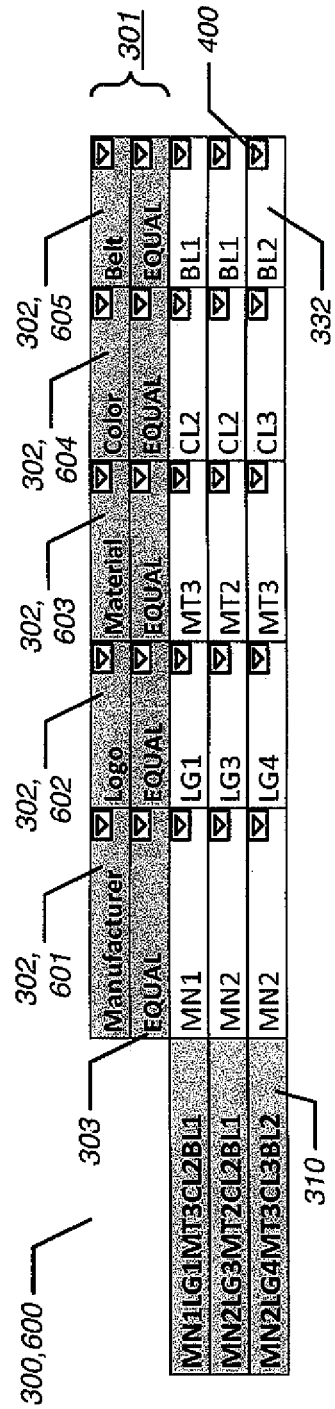
FIG. 6 is a chart illustrating compactness of a Constraint-Choice-Action Matrix, that conveys the same information as FIG. 5.

FIG. 6 presents the same information as FIG. 5 using a CCA matrix 300. The same factors, or variable expressions 302 (namely, Manufacturer 601, Logo 602, Material 603, Color 604 and Belt 605) head the columns 102, but in this case their values 106 may be entered by pick-lists 1400 through the controls 400 in cells 105. In this particular embodiment, the operators 303 can also be entered with pick-lists 1400. Here the operators are all "EQUAL" (is equal to), to correspond with the counterpart matrix of FIG. 5. In this particular example, the row headings, or actions 310, are static part numbers, to illustrate that pick-lists 1400 are optional for actions 310. (They are also optional for variable constraints, factors, and operators.)

The number of columns 102 in the CCA matrix 300 will typically be exactly equal to the number of factors, one factor per constraint 301. In this case, there are 5 factors and, hence, 5 columns. Significantly, the entries 106 for the cells 105 are selected from pick-lists 1400. This makes construction of the CCA matrix 300 simple. And reading across a row is more intuitive than in the previous matrix, because the information is expressed much more directly and concisely.

Each factor 302, such as "Manufacturer", might be selected from a pick-list 1400. A factor 302 might be selected from a tree 1280 (see FIG. 12b) to form an expression like vehicle.engine.rpm, or it might be an expression formed from elements of a tree 1280, such as vehicle.TopSpeed( ) (where the parentheses indicate an executable function or method), or it can be a user-entered expression. The tree 1280 may contain functions that can be used in expressions; for example, vehicle might have a TopSpeed( ) function that returns its top speed.

Figures 7, 8:
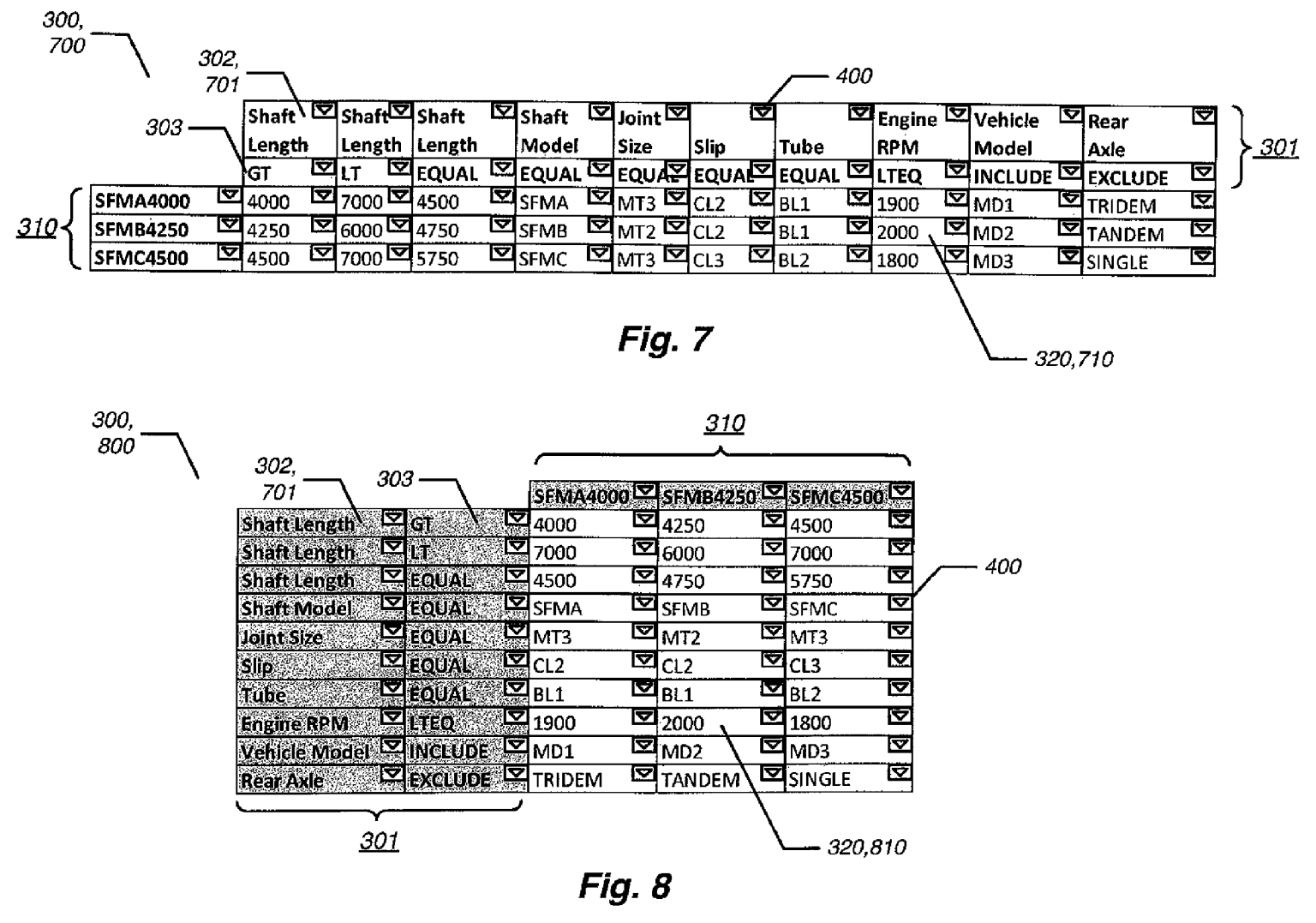

FIG. 7 depicts Drivetrain System CCA Matrix 700, of a CCA matrix 300 based on the format of FIG. 6, for a drivetrain system of a truck or bus. The factors, or variables 302, are typified by "Shaft Length", which is labeled with a reference number in the figure. This figure illustrates that operators 303 which are used in forming constraints 301 are not necessarily "EQ" (is equal to). This CCA matrix 300 uses "GT" (greater than), "LT" (less than), "LTEQ" (less than or equal to), "INCLUDE", and "EXCLUDE" in building condition 301 boolean statements. These kinds of factors cannot be expressed using the format for information representation of FIG. 6. Another difference from FIG. 6 is that actions 310 in this embodiment may be selected from pick-lists 1400. The facility for entering information into may be quite powerful; for example, the little arrow in the ShaftLength factor 302 will display either a tree 1280 for picking a parameter, or a function with a text editor to type in an arbitrary expression.

FIG. 8 depicts Drivetrain System CCA Matrix 800, which contains the same information and functionality as Drivetrain System CCA Matrix 700, but in transposed form. Hence, the entry 710 in column/condition "Engine RPM" and row/action "SFMB4250" of Drivetrain System CCA Matrix 700 appears as the entry 810 in row/condition "Engine RPM" and column/action "SFMB4250" of Drivetrain System CCA Matrix 800. Note that the actions 310, in this case the BOM entries, can be literal, computed from an expression that uses the values 106 of the cells 105.

Figure 9:
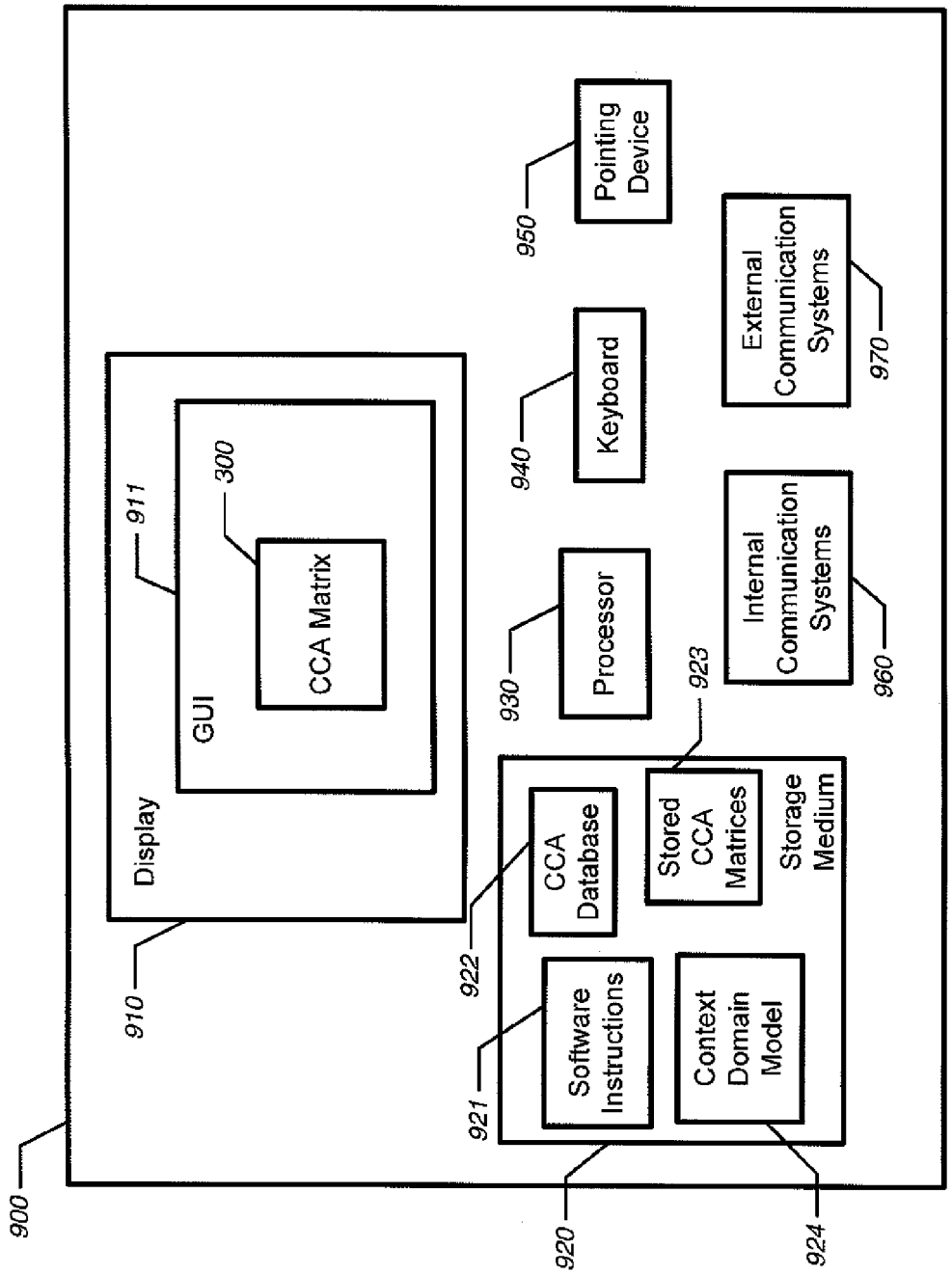
FIG. 9 is a schematic for a computer system that might be used to create and/or apply a Constraint-Choice-Action Matrix.

FIG. 9 illustrates a computer system 900 that might be implement a CCA matrix 300. The system includes a display 910 or monitor for presenting a GUI 911, through which the CCA matrix 300 might be depicted and interacted with by a user. Such interaction might involve a keyboard 940, and a pointing device 950 (e.g., mouse, touchpad, trackball, or a user's finger in combination with a touch-sensitive screen). The system may have a computer-readable storage medium 920. The storage medium 920 might contain software instructions 921 that are used by a processor 930 to execute the software to display the CCA matrix 300 to handle the GUI, including pick-lists 1400 and controls 400, to populate the CCA matrix 300 from data, perhaps stored in one or more CCA databases 922, and to store choices 510 selected from the pick-lists 1400. The software (or more generally, any logic represented by hardware and software, which ultimately must execute on some kind of hardware) might also be used to apply a CCA matrix 300 in context. For example, given a particular object or situation having known values of the factors represented in the CCA matrix 300, the CCA matrix 300 might be scanned to find a row boolean statement that evaluates to TRUE; if so, then the corresponding action 310 might be reported, recorded, or executed. The computer system 900 will have an internal communication system 960 for communicating among these components, and may have an external communication system 970 to allow the system to communicate with the outside world, possibly through a network or one or more plug-in devices. The reader of skill in the art will realize that the system as described is a physically simple one, and within the scope of the invention, the required functionality might be divided among many and diverse physical components, not necessarily in the same location.

FIG. 9 introduces the concept of a Context Domain Model 924. A Context Domain Model 924 is a representation of information regarding a subject matter context in which the CCA matrix 300 will be applied. For example, the Context Domain Model 924 might contain a specification for a product, the specification to be used in product configuration and/or product manufacture. As configuration of the product evolves, the product specification in the model will evolve too. The model may contain rules for design; potentially applicable government regulations; information about style and popularity; processes, such as how to optimize; data, saved or stored in various forms; coding tools, including tools for editing, data access, and expressing relationships. There may be tools for visualization of the information in the model.

In general, a Context Domain Model 924 may contain any data, processes, and tools relevant to a subject matter domain. A CCA matrix 300 within the scope of the invention can exist and be useful without a Context Domain Model 924. However, when a corresponding Context Domain Model 924 does exist, it may restrict which factors, values, and actions can appear in the CCA matrix 300, while at the same time making it easier to construct ones that make sense, and will be valid, within a context. The Context Domain Model 924 may allow these items to be selected from pick-lists 1400, or computed using expressions in a coding language.

Figure 10:
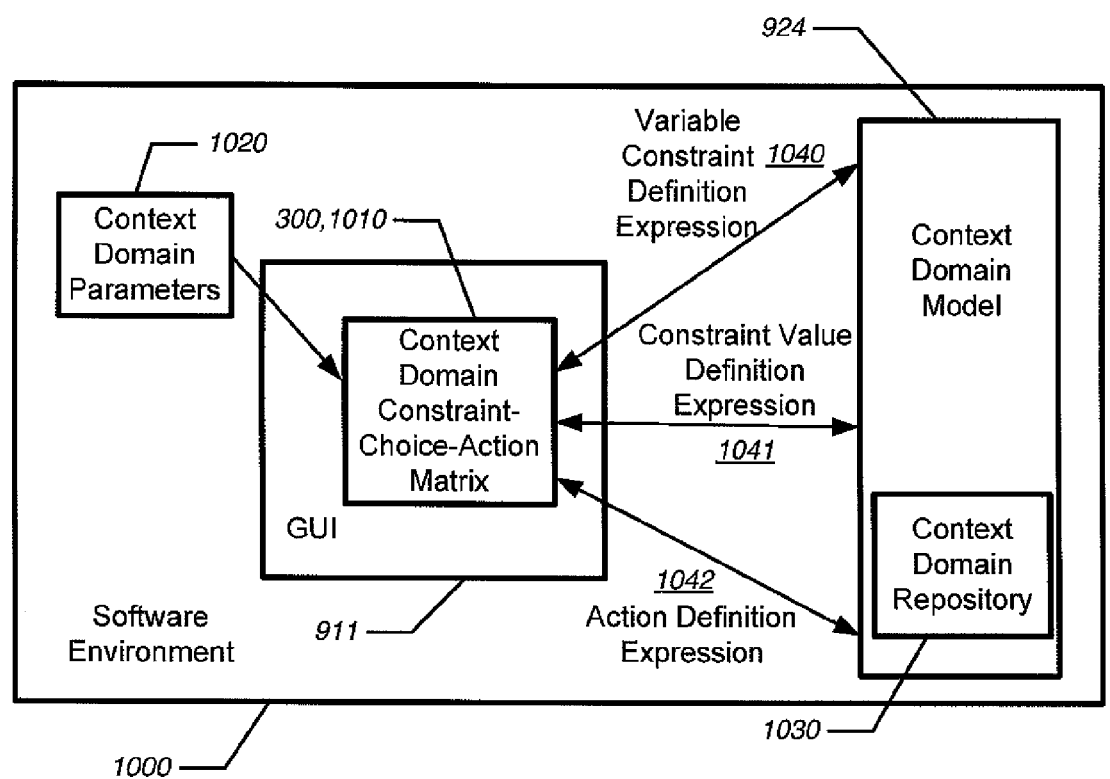
FIG. 10 is a schematic for a creation of a Constraint-Choice-Action Matrix corresponding to a Context Domain Model.

FIG. 10 illustrates creation of a CCA matrix 300 within the scope of a Context Domain Model 924. A software environment 1000 may implement and/or manage both the Context Domain Model 924 and creation of the CCA matrix 300. The software environment 1000 may run in a processing system, such as the computer system 900 shown in FIG. 9, locally and/or remotely, or it may run in the "cloud" and deliver functionality through a local processing system. Because of its interaction with a Context Domain Model 924, we refer to the CCA matrix 300 in this figure as a Context Domain CCA Matrix 1010.

Creation of any CCA matrix 300 requires one or more context domain parameters 1020, which may be specified explicitly or may be understood or assumed, by users or logic (processing hardware, or software instructions executing on processing hardware). The context domain parameters 1020 specify what kind of object or situation the CCA matrix 300 will ultimately be applied to, such as a vehicle, or an engine system within a truck. The constraints 301 and actions 310 must all make sense within this context. If the CCA matrix 300 is based on a Context Domain Model 924, then the context domain parameters 1020 must be consistent with the Context Domain Model 924, and might be selected from the Context Domain Model 924 by a user-provided code expression or by user selection from a pick-list 1400.

Definition of a variable constraint 301 may be done by sending a variable constraint definition expression 1040 to the Context Domain Model 924, which in turn may populate the column header, or some portion thereof, such as a factor 302. This two-way interaction is depicted in FIG. 10 by a bidirectional arrow. A factor 302 might be specified by a user through a pick-list 1400, provided by the Context Domain Model 924 using a context domain repository 1030; or it may be specified by the user by typing an expression into a text window, the expression then being checked for validity by the Context Domain Model 924 before it populates the variable 302. Selection of the factor 302 portion of a variable constraint 301 in this way may allow the context domain repository 1030 to provide a pick-list 1400 for an operator 303 that is consistent with the factor 302. Specification of cell values 106 may be done using a similar process with a constraint value definition expression 1041; and specification of actions 310, or row headers, may also be performed similarly with an action definition expression 1042.

Figure 11:
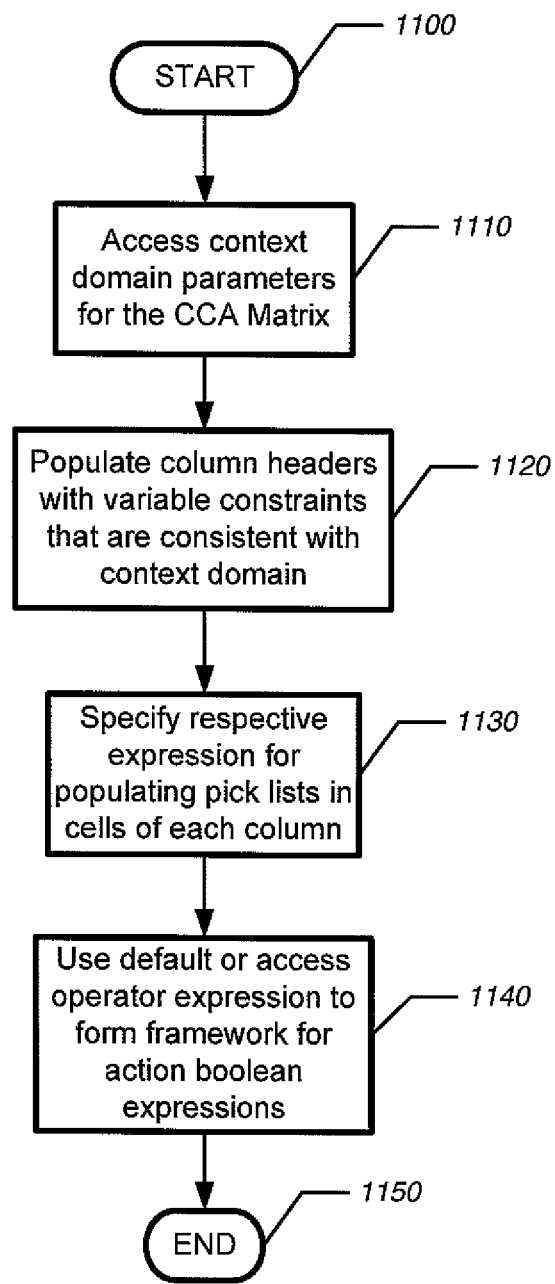
FIG. 11 is a flowchart illustrating definition of variable constraints in a Context Domain CCA Matrix.

FIG. 11 is a flowchart illustrating definition of column elements in a Context Domain CCA Matrix 1010. After 1100, context domain parameters 1020 are accessed 1110. The context domain parameters 1020 may be specified by a user, provided by a Context Domain Model 924, or selected automatically from a context domain repository 1030. Column headers are populated 1120 that are consistent with the context domain. As described above, this step may involve first specifying a variable 302 or factor 302 (e.g., "horsepower"), and then selecting an operator 303 (e.g., "EQ"). Next, a default expression is specified 1130 for populating the pick-lists 1400 for cells 105 in the column (e.g., values of horsepower in some range, in increments of 100 units). An expression for combining 1140 cell boolean expressions into an action boolean expression is either provided through the GUI, or a default expression is used. At this point, the overall restrictions on a column in the CCA matrix 300 have been completely specified, and the process ends 1150.

Figure 12A:
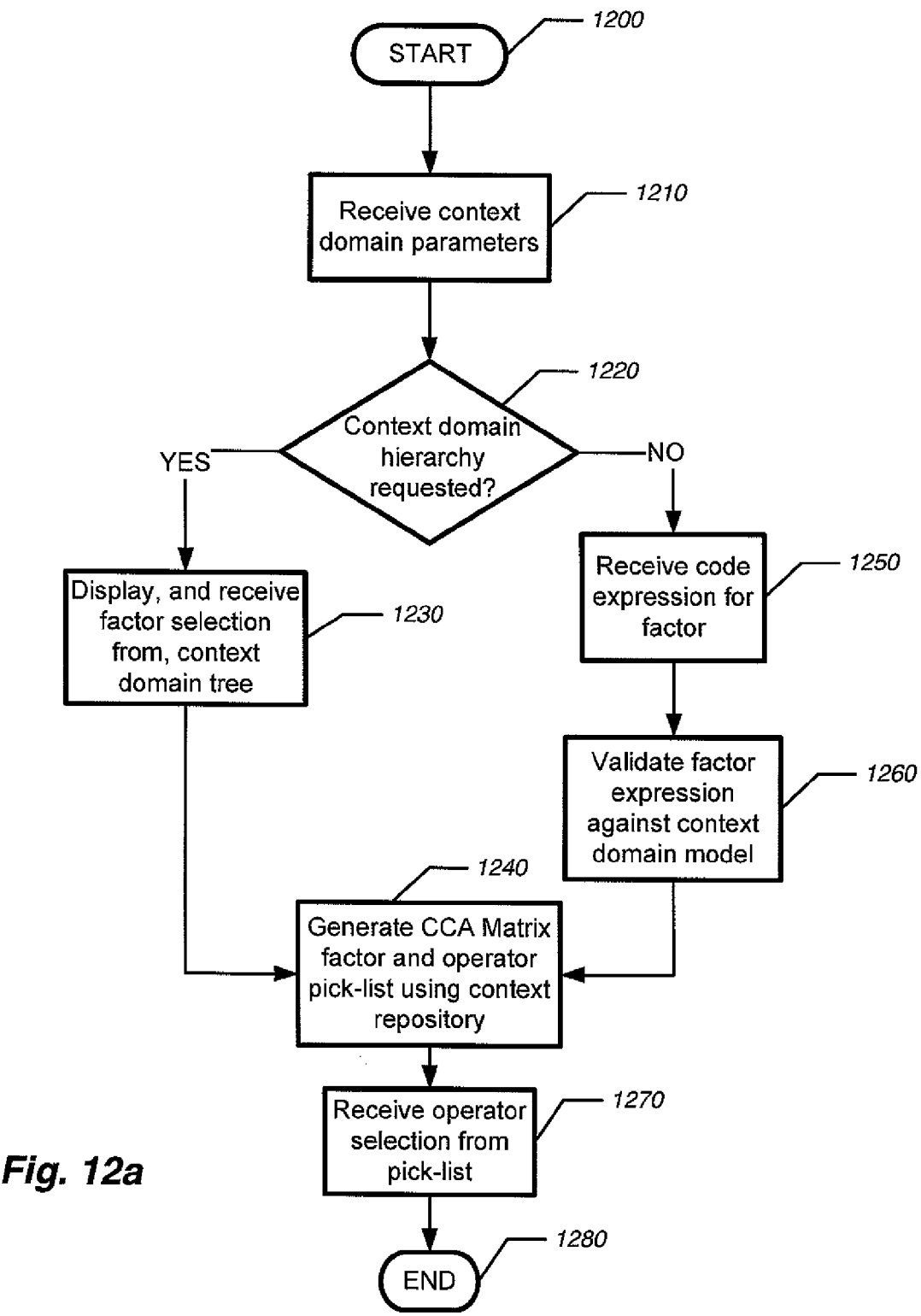
FIG. 12a is a flowchart illustrating selection of a factor in a variable constraint using a tree that corresponds to a Context Domain Model.

FIG. 12*a* is a flowchart illustrating definition of variable constraints 301 in a Context Domain CCA Matrix 1010. At the start 1200, context domain parameters are received 1210 or accessed. If a user request for a context domain hierarchy has been received 1220, then a tree 1280 (see, e.g., FIG. 12*b*) depicting valid choices for a column header factor 302 is displayed, and a user selection from the tree is received 1230. Alternatively, if a context domain hierarchy is not requested, the matrix creator may directly provide 1250 (e.g., by typing into a text box for specifying code) an expression for the factor 302 and operator 303. The expression may specify the factor explicitly, or cause it to be calculated from a Context Domain Model 924. The expression must successfully validate 1260 against the Context Domain Model 924 before the next step. Once valid expressions for the factor 302 and operator 303 are determined by either method, a pick-list 1400 for operator 303 selection, whose entries may depend on the particular factor 302, is displayed and a choice is received 1270. The process ends 1280.

Figure 12B:
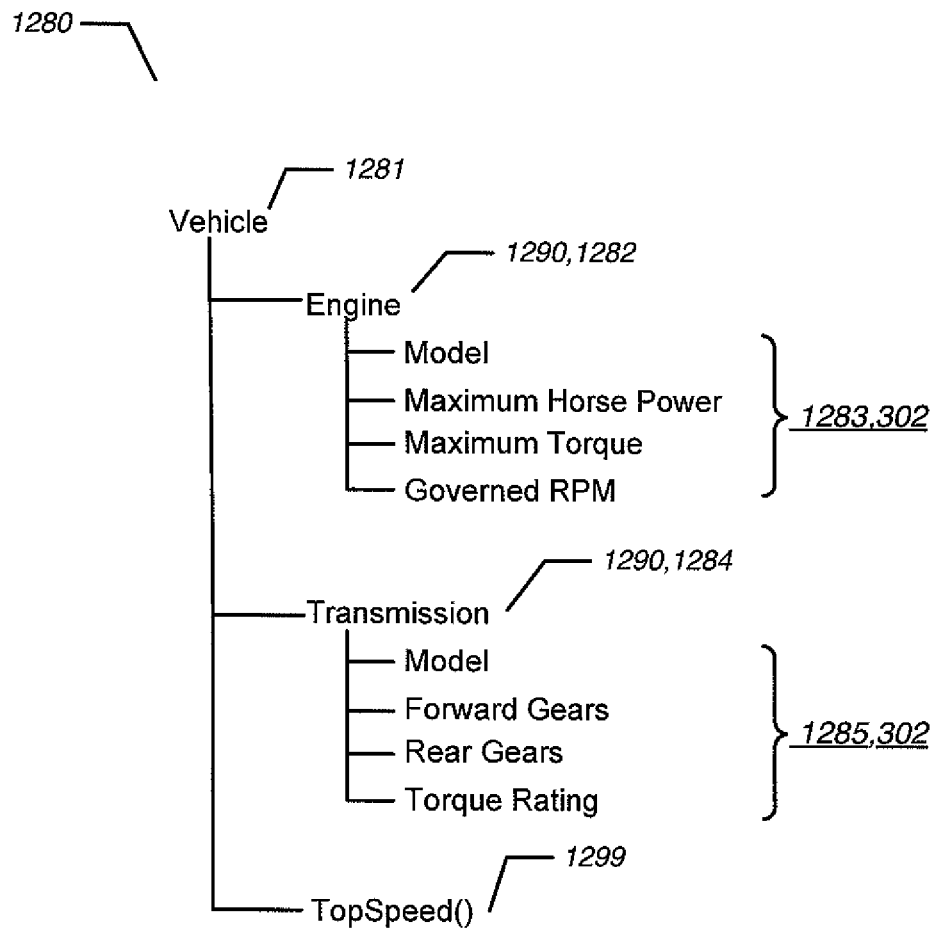
FIG. 12b is a tree from a Context Domain Model for a vehicle, from which a context domain (e.g., a system) and factors in a Constraint-Choice-Action Matrix may be selected.

FIG. 12b is a tree 1280 such as might be contained in a Context Domain Model 924. A technician wanting to create a new Context Domain CCA Matrix 1010 might specify the context domain 1281 "Vehicle" to the software environment 1000. The user might then be allowed to choose a context domain parameter 1020 for the Context Domain CCA Matrix 1010, such as a system 1290 from the tree 1280, e.g., the engine system 1282 or the transmission system 1284. "Vehicle" and the particular system 1290 are context domain parameters 1020. The software environment 1000 uses the system 1290 to limit the kinds of constraints 301 and actions 310 that will be found in the Context Domain CCA Matrix 1010, which will be applied to the object or situation, "Vehicle". When a column header is selected in the process of FIG. 12a, the user may be allowed to choose from the corresponding factors 302. For example, for the engine system 1282, the possible factors 302 in this embodiment are the engine factors 1283 shown, namely, Model, Maximum Horse Power, Maximum Torque, and Governed RPM. For the transmission system 1284, the possible factors 302 are the transmission factors 1285, namely, Model, Forward Gears, Rear Gears, and Torque Rating. The tree 1280 might include functions that can be used as factors 302, such as the TopSpeed function 1299. In general, the tree 1280 can be used for picking single parameters, single functions, or multiple parameters/functions to form an expression. The same tree 1280 capabilities may be available for expressing an action 310.

Figure 13:
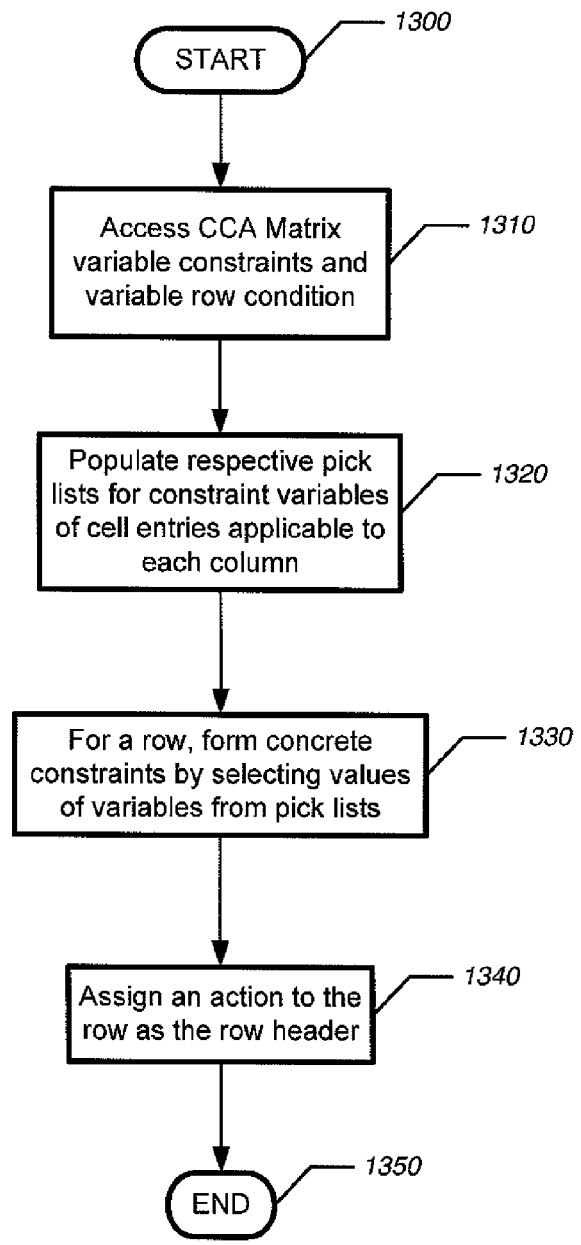
FIG. 13 is a flowchart illustrating the creation of an action in a Constraint-Choice-Action Matrix.

In practice, specification of a CCA matrix 300 will be done in phases, often by different engineers. The first phase, defining the general aspects of the columns, is depicted by FIG. 10-12b. The second phase, specifying values 106 of the cells 105 in a row, and the corresponding action 310, is illustrated by FIG. 13. Specification of the actions 310 may be done in many sessions over time, as the CCA matrix 300 evolves.

After the start 1300 in FIG. 13, the variable constraints 301 (column headers) and a variable action boolean expression, or row condition, are accessed 1310. The variable row condition is the framework for a boolean statement or expression that couples the columns 102, such that if the boolean statement is true, the row action 310 should be executed. In step 1240 of FIG. 12a, a default pick-list 1400 for values 106 of the variable constraint 301 for each column was selected. These default pick-lists 1400 may be modified for cells in a particular row in step 1320 of FIG. 13. For example, values of horsepower, according to the default pick-list 1400, might be restricted by this step to values available from a particular manufacturer. The variable constraints 301 are made concrete for the row by selecting 1330 particular values 106 from the row pick-lists 1400. An action 310 for the row is assigned 1340, possibly by selecting from a pick-list 1400, or by providing an expression to a Context Domain Model 924. Some typical actions were previously discussed in the Summary section of this document. The flow ends 1350.

Figure 14A:
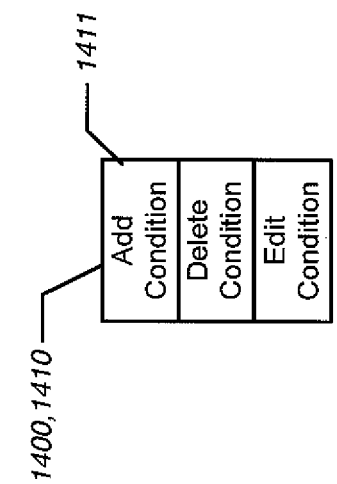
FIG. 14a is a drop-down list illustrating choices for modifying the set of conditions/constraints (typically column heads) in a Constraint-Choice-Action Matrix.

A pick-list 1400 might be implemented a check box, a radio box, a choice box, a drop-down list, a combo box, a table, or any other control 400 presentable by a GUI 911 that allows a user to select one or more listed values. FIG. 14a-14c illustrate some typical pick-lists 1400 that might be used in creating a CCA matrix 300. For example, right clicking with a mouse on a condition 301, or column header, might display the condition pick list 1410 of FIG. 14a, showing a set of choices typified by the pick "Add Condition" 1411. Left clicking with a mouse on an operator 303 in a column header might display the operator pick list 1420 of FIG. 14b, showing a set of choices typified by the pick "EQUAL" 1421. For example, choices for an operator 303 might include LT, LTEQ, GT, and GTEQ. Right clicking with a mouse on an action 310 in a row header, might display the action pick list 1430 of FIG. 14c, showing a set of choices typified by the pick "Add Action" 1431.

Figure 15:
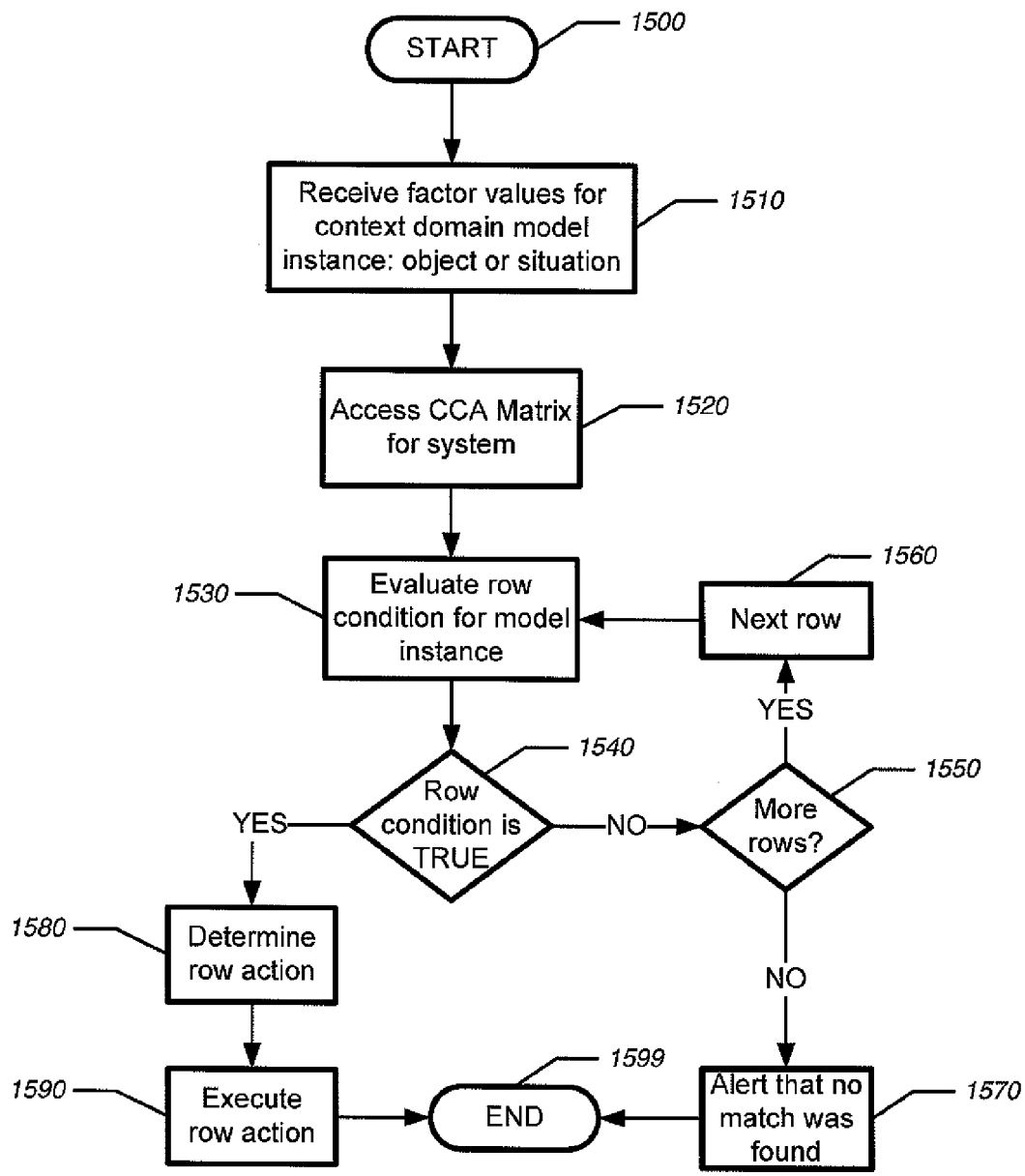
FIG. 15 is a flowchart illustrating the application of a Constraint-Choice-Action Matrix to an instance of a context domain model.
Figure 16:
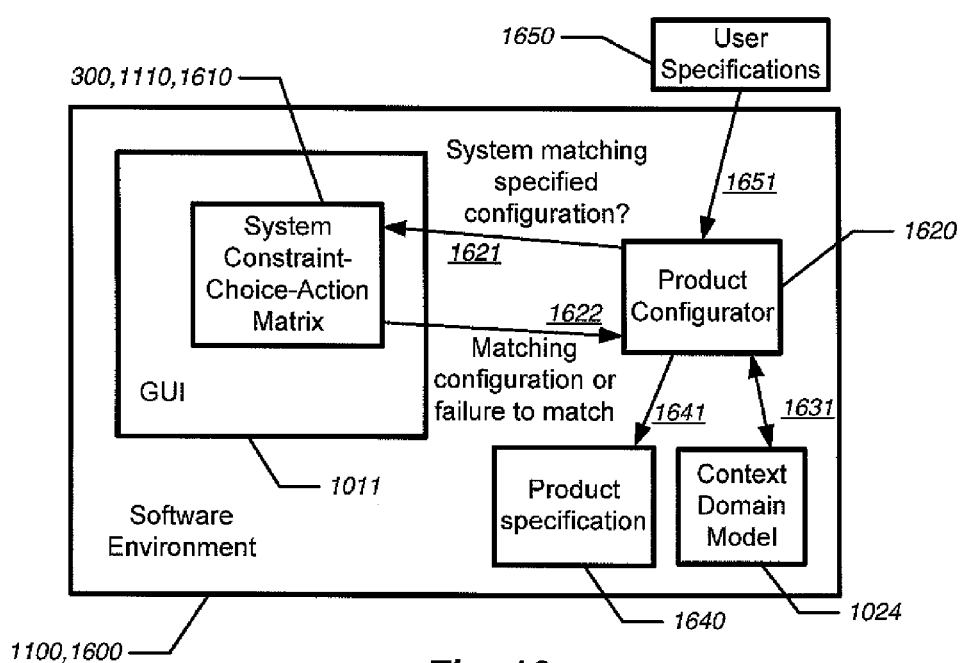
FIG. 16 is a schematic diagram illustrating the application of a Constraint-Choice-Action Matrix to configure a product.

FIG. 10-14c all dealt primarily with creation of a CCA matrix 300. FIG. 15-16 pertain to application of a CCA matrix 300 to a particular object or situation within the context domain 1281.

At the start 1500 of FIG. 15, values of the factors 302 for an instance of the context domain 1281, a particular object or situation, are received 1510. For example, in the context domain 1281 of VEHICLE and system ENGINE, specifications for a particular engine from a particular manufacturer are accessed 1520 from a context domain repository 1030. The CCA matrix 300 is also accessed. The action boolean expression or condition, applicable to a row 101 in the CCA matrix 300, is evaluated 1530. This entails evaluating the concrete constraints 301 of each of the columns 102 for the context domain 1281 instance as applied to the context domain instance, and then combining them with the specified boolean operators (i.e., the action boolean expression framework) to evaluate the action boolean expression. If 1540 the row condition is TRUE, then the corresponding row action 310 is determined 1580, and (optionally) executed 1590. If the row condition is FALSE, and if there are more rows 101, the next row is checked 1560. If no row for which the row condition evaluates to true is found, then an alert may be generated 1570 to that effect. The flow ends 1599.

In alternative embodiments of the above process, the loop may continue after the first match is found, in order to find all matches. If only one match is expected, but two or more are found, then an alert may be generated to indicate the inconsistency.

Two important applications of a CCA matrix 300 are product configuration/design, and product manufacture. FIG. 16 illustrates a system CCA Matrix 1610 applied to product configuration within a product configuration software environment 1600. A product configurator 1620 receives 1651 a set of user specifications 1650 for design of a product, which might be a custom design. The product configurator 1620 searches 1621 a respective system CCA Matrix 1610 for each system 1290 of the product, accessing 1631 a Context Domain Model 924 as appropriate. A matching system 1290 (one that satisfies an action boolean expression) or a failure to match notice is returned 1622. When all systems 1290 have been matched, a complete product specification 1640 is created. The product specification 1640 can be priced and reviewed by a customer. Once finalized, its systems, subsystems, or parts may be ordered from suppliers; and the product may be assembled using the method a system of FIG. 17.

Figure 17:
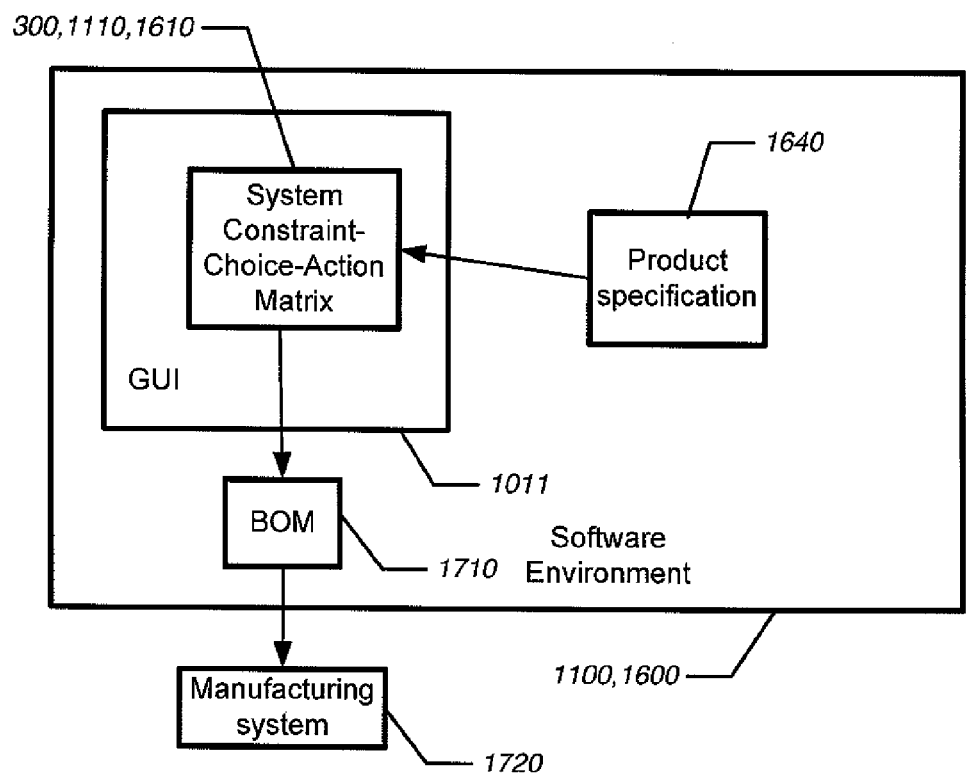
FIG. 17 is a schematic diagram illustrating the application of a Constraint-Choice-Action Matrix to create a bill of materials from a product specification.

FIG. 17 illustrates a CCA matrix 300 applied to product manufacture. A product specification 1640, possibly created as in FIG. 16, uses a system CCA Matrix 1610 to create a BOM 1710 for a product. The BOM 1710 is then used by a manufacturing system 1720 to manufacture the product.

Figure 18:
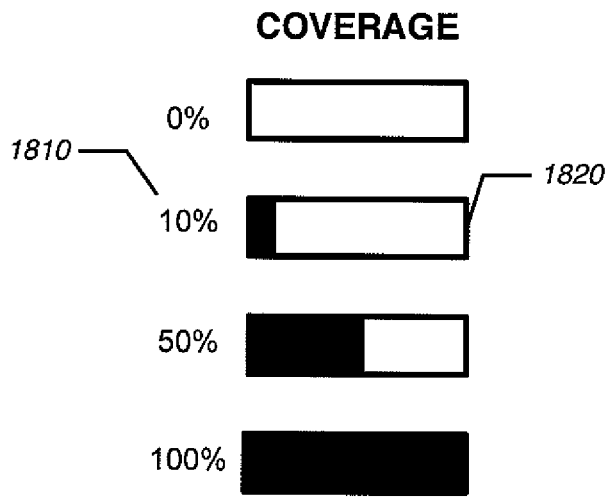
FIG. 18 illustrates a scheme for displaying coverage of particular factor instances using a coverage bar.
Figure 19:
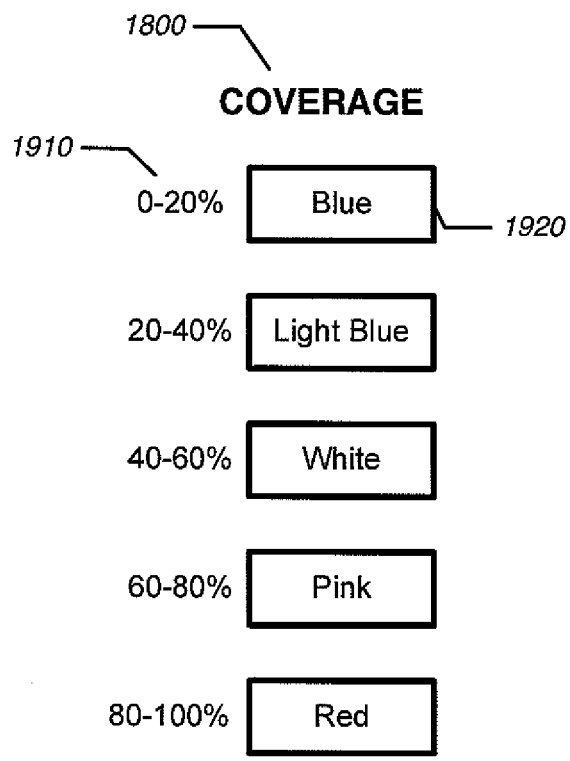
FIG. 19 illustrates a scheme for displaying coverage of particular factor instances using a color scale.

Manufacturers preferably design and manufacture systems and products that are desirable to customers. In some industries, this concept is called "coverage". Used to configure new systems, a CCA matrix 300 provides an opportunity to convey coverage to an engineer choosing cells 105 within a row 101 to correspond to an action 310, such as a system configuration for a BOM 1710. FIGS. 18 and 19 to display coverage 1800 for a particular value 106 of a particular factor 302 in a CCA matrix 300. Preferably this information, based on statistical sales data, product reviews, and/or forecasts, would be displayed in a cell 105 of the CCA matrix 300 to assist the matrix designer in selecting values 106 of factors 302. FIG. 18 shows a coverage bar 1820 to display various values of coverage percentage 1810. FIG. 19 shows coverage percentage range 1910 corresponding to colors in a color coverage range indicator 1920. For example, the color of a cell 105 in the CCA matrix 300 may be a color coverage range indicator 1920. Many other techniques for presenting coverage 1800 in cells 105 are possible within the scope of the invention, such as simply showing a percentage, or displaying a bar chart above the CCA matrix 300 in pseudo-3D on demand, with coverage 1800 indicated as height of a bar above a cell 105.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A computer system, comprising:
   a) a display;
   b) a graphical user interface (GUI) depicted on the display;
   c) a matrix X displayed by the GUI, such that, for a matrix Y that is equal either to X or to X-transpose,
      (i) a set of columns of Y, each column in the set having a column header that represents a respective column boolean expression that includes a column variable,
      (ii) a row of Y has a row header that represents a row action, and
      (iii) within the row, the set of cells that correspond to the set of columns each cell providing a GUI control, which when activated displays a respective list from which a user can use the GUI to select a value of the column variable for the column, thereby forming a cell boolean expression,
      wherein the cell boolean expressions for the row are related to each other by boolean operators, thereby representing a row boolean expression; and the row action corresponds to a particular value of the row boolean expression.

2. The computer system of claim 1, wherein the column header includes a factor and an operator.

3. The computer system of claim 2, wherein a cell boolean expression specifies a characteristic of an object.

4. The computer system of claim 3, wherein the object is a machine.

5. A method, comprising:
   (a) depicting, through a graphical user interface (GUI) on an electronic display, a matrix X, such that, for a matrix Y that is equal either to X or to X-transpose,
      (i) a set of columns of Y, each column in the set having a column header that represents a respective column boolean expression that includes a column variable,
      (ii) a row of Y has a row header that represents a row conclusion, and
      (iii) within the row, the set of cells that correspond to the set of columns each cell providing a GUI control, which when activated displays a respective list from which a user can use the GUI to select a value of the column variable for the column, thereby forming a cell boolean expression,
      wherein the cell boolean expressions for the row are related to each other by boolean operators, thereby representing a row boolean expression; and the row conclusion corresponds to a particular value of the row boolean expression.

6. The method of claim 5, further comprising: b) receiving, through the GUI control corresponding to a cell in the row, a value of the column variable for the column, thereby forming a cell boolean expression.

7. The method of claim 5, further comprising:
   c) receiving a set of specifications within a context domain that corresponds to X; and
   d) evaluating the row boolean expression as applied to the set of specifications.

8. A non-transitory computer-readable medium, comprising:
   a) means for displaying a window on a display; and
   b) means for displaying a matrix X in the window, such that, for a matrix Y that is equal either to X or to X-transpose,
      (i) a set of columns of Y have column headers that specify a factor and an operator,
      (ii) a row of Y has a row header that represents a row conclusion, and
      (iii) within the row, the set of cells that correspond to the set of columns each provide a GUI control, which when activated displays a respective list from which a user can use the GUI control to select an operand to be a value of the respective cell, the value of the cell in combination with a respective column header of that cell forming a cell boolean expression,
      wherein the cell boolean expressions for the row are related to each other by boolean operators, thereby representing a row boolean expression; and
      the row conclusion corresponds to a particular value of the row boolean expression.

9. A display device that displays a representation of a matrix Y, which is equal to a matrix X or to the transpose of X, the matrix X comprising:
   a) a set of columns, each column in the set having a column header that represents a respective column boolean expression that includes a column variable;
   b) a row of a row header that represents a row action; and
   c) within the row, a set of cells that correspond to the set of columns, each cell providing a graphical user interface (GUI) control, which when activated displays a respective list from which a user can use the GUI control to select a value of the column variable for the column, thereby forming a cell boolean expression;
   wherein the cell boolean expressions for the row are related to each other by boolean operators, thereby representing a row boolean expression; the row action corresponds to a particular value of the row boolean expression; and the matrix Y is represented in tangible storage.

* * * * *